UNITED STATES PATENT OFFICE.

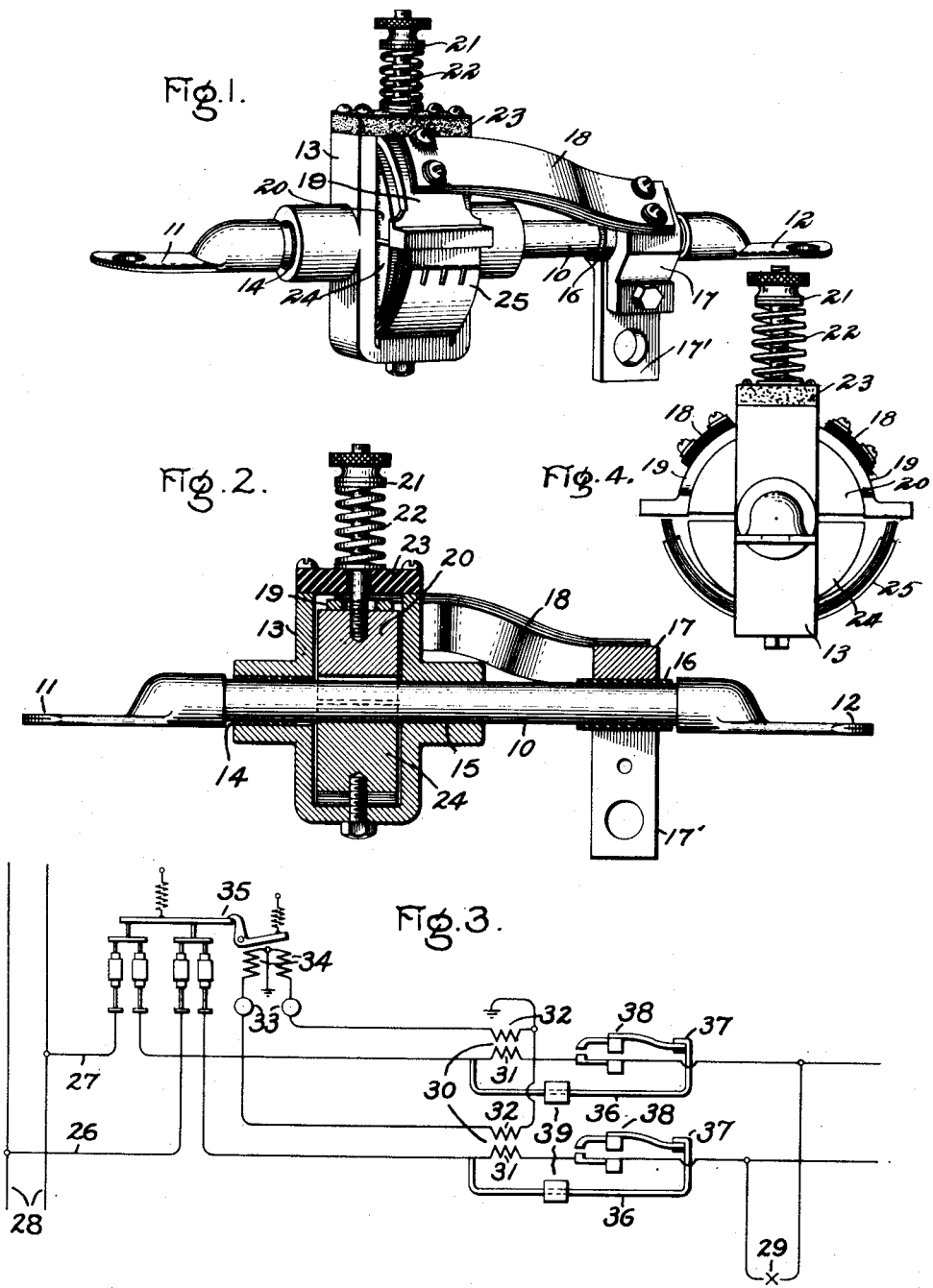

CHARLES J. BARROW, OF LOS ANGELES, CALIFORNIA, ASSIGNOR TO GENERAL ELECTRIC COMPANY, A CORPORATION OF NEW YORK.

PROTECTIVE DEVICE FOR ELECTRIC DISTRIBUTING SYSTEMS.

1,220,813. Specification of Letters Patent. Patented Mar. 27, 1917.

Application filed January 30, 1913. Serial No. 745,205.

*To all whom it may concern:*

Be it known that I, CHARLES J. BARROW, a citizen of the United States, residing at Los Angeles, county of Los Angeles, State of California, have invented certain new and useful Improvements in Protective Devices for Electric Distributing Systems, of which the following is a specification.

My invention relates to alternating current distributing systems and more particularly to means for protecting apparatus such as transformers, included in such a system, from the effects of abnormal currents. A circuit breaker is usually included in such systems, but a circuit breaker as ordinarily constructed and connected in the system does not always open quickly enough to prevent damage to the transformer arising from an abnormal current, and conditions have arisen under which the transformer has been burned out before the circuit breaker could operate.

The object of my invention is to protect the transformer or other device from the abnormal current when the conditions are such that the circuit breaker does not operate quickly enough to give the required protection. It is customary to have the trip coils of the circuit breaker in circuit with the secondary of the transformer. In order, therefore, that the rest of the system will receive the usual protection it is a further object of my invention to afford this additional protection to the transformer without depriving the rest of the system of the protection afforded by the circuit breaker.

In carrying out my invention, I divert an abnormal current from the transformer by some suitable means so constructed that it will operate instantaneously upon the occurrence of the abnormal current and will be much more rapid in its operation than the circuit breaker. I also provide means to insure the simultaneous action of the circuit breaker. For protecting the transformer *per se*, I employ means, such as my improved electromagnetic switch, which will instantaneously form a low resistance shunt around the primary thereof upon the occurrence of an abnormal current. To insure the operation of the circuit breaker I prefer some means which will limit the diversion of current through the aforesaid shunt to that which is in excess of the current necessary to operate the circuit breaker. I prefer to utilize for this purpose a device which will add sufficient impedance to the shunt circuit to properly limit the flow of current therein.

My improved electromagnetic switch comprises a pair of magnetic bodies which are normally separated by a small air gap and are disposed around a conductor. At least one of the magnetic bodies is movable and resiliently supported. In connection with the said bodies are provided means for completing an electric circuit when the said bodies have approached each other sufficiently under the influence of the current flowing in the aforesaid conductor. When it is to be used in connection with such a system as that hereinbefore described, one of the bodies is provided with a single terminal connection and the other is connected to the conductor and thus has two terminal connections. In order that good electric contact may be secured I prefer to mount on each of the magnetic bodies, members which will engage each other with a spring or yielding contact when the said bodies are sufficiently attracted to each other.

My invention will be more clearly understood by referring to the accompanying drawing in which Figure 1 is a view in perspective of my improved electro-magnetic switch. Fig. 2 is a partial longitudinal vertical section thereof; Fig. 3 is a diagrammatic view of an alternating current distributing system embodying my invention, and Fig. 4 is an end elevation of my electromagnetic switch.

As shown in Figs. 1 and 2, 10 is a heavy conductor or bar composed of copper or other good conducting material. The said bar preferably comprises terminals 11 and 12 integral therewith. Attached to the bar 10 is a bracket 13 which may be of metal. The said bracket is insulated on one side thereof from the bar 10 by the insulating bushing 14 and is in electrical contact with the said bar on the other side thereof at 15. Attached to the other end of the bar 10 and electrically insulated therefrom by means of the bushing 16 is a bracket 17, having a suitable terminal 17'. The said bracket is resiliently and electrically connected preferably by means of laminated metal springs 18 to the contact brushes 19. The brushes 19 are mounted on the movable magnetic body 20 which is composed preferably of iron or steel. The body 20 is preferably semi-cylindrical in shape and is normally separated slightly from the bar 10 being resiliently held in position by means of the adjustable abutment 21 which rests upon the coil spring 22 and is supported by the insulating block 23 upon the bracket 13. On the opposite side of the bar 10 and supported by the bracket 13 is a stationary magnetic body 24 preferably similar in shape to the body 20. Electrically and mechanically connected to the bracket 13 are contact brushes 25 which are preferably resilient and composed of strips of copper.

In Fig. 3 is illustrated a system in which the above described switch is utilized and which constitutes one form of embodiment of the other portion of my invention. As shown therein 26, 27 are supply mains for a house or similar circuit which are connected to the street mains 28. Connected across the mains 26, 27 are translating devices, such as 29 which are ordinarily connected in such a circuit. Connected intermediately in the supply circuit are transformers 30 having primary coils 31 and secondary coils 32. The latter are connected to the meters 33, and also to the trip coils 34 of a circuit breaker 35 of the usual form. Around the primaries 31 of the transformers are connected conductors 36 which may be bars of copper or other good conducting material. The terminal 37 of each of these bars is connected to the terminal 17' of my improved electromagnetic switch which is shown diagrammatically at 38. Around each of the bars 36 is disposed an iron ring 39 or other suitable means for bringing the impedance of the circuit up to a predetermined amount. This amount should be such that upon the operation of the electromagnetic switch 38 due to an abnormal current there will still be sufficient current passing through the transformer to insure the operation of the circuit breaker 35.

The above described apparatus may be so adjusted that, upon the passage through the transformer primary of an abnormally high current, the magnetic field induced in connection with the magnetic members 20 and 24 will be of such strength that the member 20 will be drawn toward the member 24 sufficiently to cause the brushes 19 and 25 to contact and form a shunt circuit around the primary of the transformer through the bar 36. Most of the abnormal current will be diverted through this shunt circuit. At the same time the impedance caused by the ring 39 will limit this diversion of current so that there will still be sufficient current passing through the transformer to energize the trip coils 34 and thereby open the circuit breaker 35. Owing to the structure of my improved electro-magnetic switch the action thereof will be practically instantaneous and considerably more rapid then that of the circuit breaker 35.

Various changes and modifications of the above described apparatus will suggest themselves to those skilled in the art and are to be considered as coming within the scope of the same as set forth in the following claims.

What I claim as new and desire to secure by Letters Patent of the United States, is:—

1. In combination with an electrical conductor, a body of magnetic material electrically connected to said conductor, a second body of a material in inductive relation to said first mentioned body but separated therefrom, coöperating contacts carried by said bodies, a support carried by said conductor and insulated therefrom, a resilient connection between said support and the contacts carried by said second mentioned body, and means for adjusting the distance between the said bodies.

2. A circuit making and breaking device comprising an electric conductor, a bracket mounted upon said conductor, a body of magnetic material carried by said bracket and maintained in electrical connection with said conductor, a coöperating body of magnetic material carried by said bracket and movable toward said first mentioned body, adjusting means for varying the distance between said bodies, means for resiliently supporting said coöperating body, and contacts carried by said bodies and adapted to be moved into engagement in response to movement of said bodies.

3. An electromagnetic switch comprising a conductor, a body of magnetic material responsive to electrical conditions in said conductor, a coöperating body of magnetic material insulated from said conductor and movable in response to predetermined electrical conditions in said first mentioned body, a support for said bodies carried by said conductor and insulated therefrom, coöperating contacts carried by said bodies, and adjusting means for varying the distance between said bodies.

4. An electromagnetic switch comprising an electric conductor, a body of magnetic material responsive to electric conditions in said conductor, a coöperating movable body of magnetic material spaced apart from said first mentioned body, contacts carried by said bodies and movable into engagement with each other, a support carried by said conductor but insulated therefrom, a spring connection between the contacts of said coöperating body and said support, a terminal carried by said support, and adjusting means for varying the space between said bodies.

In witness whereof, I have hereunto set my hand this 24th day of January, 1913.

CHARLES J. BARROW.

Witnesses:
 Ross P. BRALEY,
 ADDISON D. NICKERSON.